United States Patent [19]

Schabert et al.

[11] 3,929,567

[45] Dec. 30, 1975

[54] NUCLEAR REACTOR EQUIPPED WITH A FLOODING TANK AND A RESIDUAL HEAT REMOVAL AND EMERGENCY COOLING SYSTEM

[75] Inventors: Hans-Peter Schabert; Franz Winkler, both of Erlangen, Germany

[73] Assignee: Siemens Aktiengesellschaft, Munich, Germany

[22] Filed: Apr. 9, 1973

[21] Appl. No.: 349,537

[30] Foreign Application Priority Data
Apr. 11, 1972   Germany............................ 2217398

[52] U.S. Cl.................................. 176/38; 176/86 L
[51] Int. Cl............................................. G21c 9/02
[58] Field of Search............ 176/38, 39, 37.50, 86 L

[56]   References Cited
UNITED STATES PATENTS

| | | | |
|---|---|---|---|
| 2,792,324 | 5/1957 | Daley et al. | 102/43 P |
| 3,240,678 | 3/1966 | Hemmerle et al. | 176/38 X |
| 3,414,472 | 12/1968 | Chave | 176/38 X |
| 3,454,466 | 7/1969 | Pitt et al. | 176/38 |
| 3,551,289 | 12/1970 | Eich et al. | 176/86 L |

*Primary Examiner*—Robert F. Stahl
*Attorney, Agent, or Firm*—Kenyon & Kenyon Reilly Carr & Chapin

[57]   ABSTRACT

A nuclear reactor such as a pressurized-water reactor or the like is equipped with a flooding tank and a residual heat removal and emergency cooling system. The flooding tank is arranged within the containment shell at an elevation above the upper edge of the reactor core and contains a liquid for flooding the reactor core in the event of a loss of coolant.

28 Claims, 3 Drawing Figures

NUCLEAR REACTOR EQUIPPED WITH A FLOODING TANK AND A RESIDUAL HEAT REMOVAL AND EMERGENCY COOLING SYSTEM

BACKGROUND OF THE INVENTION

The invention relates to a nuclear reactor such as a pressurized-water reactor. The nuclear reactor includes a reactor pressure vessel containing the reactor core. The reactor pressure vessel is enclosed within a containment shell and the reactor further includes a coolant circuit and a residual heat removal and emergency cooling system as well as a flooding tank. The arrangement of the flooding tank within the containment shell above the reactor core permits safety injection pumps of lower capacity to be used.

The German journal *Atomwirtschaft-Atomtechnik*, Vol. 14, Sept./Oct. 1969, No. 9/10, includes an article entitled: *Das* 1200 *-MW-Kernkraftwerk Biblis* in pages 453 to 464; this article, particularly in FIG. 9, shows that the safety of the reactor demands an elaborate and, in particular, redundant emergency cooling system. Although the emergency cooling system can be partly combined with a residual heat removal system which removes the decay heat present after the reactor is shut down when the coolant circuit provided for the generation of power is closed. Generally, the requirements for the two cooling systems are so different that a large expenditure remains. This is true also, for instance, for the flooding tank from which in the event of a break of a main cooling line (maximum credible accident) or of a connecting line, coolant is supplied over the core, so that the core is flooded; that is, the core remains under water.

SUMMARY OF THE INVENTION

It is an object of the invention to substantially simplify the residual heat removal and emergency cooling system and to reduce the cost of this system.

According to the invention, a nuclear reactor such as a pressurized water reactor or the like is provided with a reactor pressure vessel containing a reactor core. A protective enclosure surrounds the reactor pressure vessel and a coolant circuit is connected to the pressure vessel for conducting coolant through the same. A residual heat removal and emergency cooling system is connected to the coolant circuit for providing cooling of the reactor core following a shut down of the reactor or a loss-of-coolant accident. A flooding tank is arranged in the protective enclosure at an elevation above the upper edge of the reactor core. The flooding tank is connected to the system and is configured to hold a quantity of liquid sufficient to flood the reactor core in the event of a loss of coolant.

It is thereby possible to reduce the output pressure of the pumps which in the event of an accident, particularly the maximum credible accident, put the emergency cooling system in operation. The increased pressure developing in the protective enclosure no longer needs to be overcome by the pumps. It is merely necessary that the pressure of the cooling water in the flooding tank is sufficient to transport the water reliably to the core in the reactor pressure vessel. In the simplest case the feed pressure can already be obtained by arranging the flooding tank at a sufficient height. The flow of the water to the reactor pressure vessel is then caused by the head of the liquid alone. The prerequisite for this is that a high opposing pressure no longer exists in the reactor pressure vessel. To ensure this also in the case that only a small leak is present so that the pressure in the primary cooling circuit of the nuclear reactor would decrease only slowly, the nuclear reactor according to a subsidiary embodiment of the invention can be provided with a quick-discharge valve associated with the reactor pressure vessel. The quick-discharge valve opens a suitable cross-section which can communicate with a space that is unobjectionable from a safety-engineering point of view; and; if required, means for the condensation of the escaping cooling steam can be provided so that also in the case of a small leak the pressure is decreased in a relatively short time to the point that the water gets from the flooding tank into the reactor pressure vessel exclusively as a consequence of its liquid head alone. This embodiment of the invention can advantageously be configured so that the water is fed into the cold branch of the coolant circuit and the quick-discharge valve is connected to the hot branch of the coolant circuit. It can then be assumed that a technically and physically simple system is almost completely free of trouble. It contains no pumps which must be motor-driven and can therefore fail. The quick-discharge valve can be provided with an energy storage device, particularly in the form of a spring, so that its release is assured even in the case of a power failure. For this reason, it is not necessary to provide redundancy for this kind of emergency cooling and it is therefore sufficient to arrange the water inlet only at the cold branch of the coolant circuit.

The savings mentioned above through the reduction of the output pressure of the feed pump to that pressure which is maximally given by the design pressure of the protective enclosure, is however, of advantage also if, for instance, for special structural reasons, it is to depend desired todepend exclusively on the head of liquid as the means for transporting the cooling water from the flooding tank into the reactor pressure vessel. In this connection and according to a subsidiary embodiment, a pump can be provided in the feed line to the reactor pressure vessel and have an output pressure which is smaller than the design pressure of the protective enclosure. Such pumps require only little power. This is important because in an emergency, particularly in the event of a maximum credible accident, it must be assumed that the entire power for the pumps of the emergency cooling system must be supplied by expensive emergency power units.

A check valve can be provided in the feed line which leads from the flooding tank to the reactor pressure vessel, so that the cooling water of the flooding tank gets automatically into the reactor pressure vessel as soon as the pressure there falls below a given value. In addition it will be of advantage to provide the capabilty of shutting the line off for the operationally pressure-free condition, for instance, by automatically closing the valve by a positioning drive.

A further embodiment of the invention provides that a feed line of the residual heat removal arrangement is connected between the check valve and the reactor pressure vessel. The feed line also contains a check valve. Then, only one input is needed at the reactor pressure vessel or at the main cooling lines corresponding to the vessel. The check valve in the feed line of the residual heat removal arrangement assures that no coolant of the emergency cooling portion gets into the residual heat removal portion of the composite system as long as the pressure in the residual heat removal portion is lower than that in the emergency cooling portion. A further simplification can be achieved by having the residual heat removal portion include a pump which drives a cooling circuit for a fuel element storage pit, the cooling circuit being connected through valves and/or check valves. The pump further has a connection with a sump within the protective enclosure. The pump of the residual heat removal portion is utilized here for three functions. In normal operation, it serves for the operational removal of the post-decay heat in the reactor core after the reactor is shut down. For this purpose the residual heat removal portion customarily includes a heat exchanger. The same heat exchanger is used if the pump of the residual heat removal arrangement places a coolant circulation in operation through the fuel element storage pit to remove the post-decay heat there also. Finally, the pump of the residual heat removal arrangement operates as a sump pump. In the event that a large leak in the reactor pressure vessel or in its cooling circuit occurs and the coolant fed into the reactor for cooling it escapes from this leak and collects in the sump of the protective enclosure, the sump pump returns the accumulated coolant to the reactor pressure vessel via the circuit, so that the reactor core remains flooded. It can be assumed here that the pressure in the core is very low, so that the basically small output pressure of the residual heat removal pump is sufficient. The residual heat removal arrangement is advantageously constructed so that it can be shut off at least in part by a control member situated outside the protective enclosure. One can thereby achieve that a certain time after the occurrence of the maximum credible accident, the residual heat removal branch is throttled by the operating personnel, so that the residual heat removal pump is used, at least partially, again also for cooling the fuel element storage pit.

In another embodiment of the invention, it is provided that a line with a safety injection pump branches off from the input line of the flooding tank ahead of the check valve. In this arrangement it is assumed that the flooding tank is to be used for flooding the reactor core also in the case when a considerable pressure is still present because there is only a small leak in the primary circuit. The safety injection pump should have an output pressure of, for instance, 100 bar, which is higher than the saturation vapor pressure of the reactor coolant. The feeding achieved with assistance of the safety injection pump can be arranged here via a switching valve which automatically shuts off the defective branch, so that only the sound branch is fed so that the cooling water gets from the flooding tank directly to the reactor core.

Structurally, the nuclear reactor of the invention can advantageously be developed so that the flooding tank is a ring adjacent to the protective enclosure. It is advantageous to fit the ring to the shape of the protective enclosure to obtain an advantageously large volume in a small space. It is preferable to construct the flooding tank of concrete coated with plastic. The flooding tank can then be combined with a cylinder which surrounds the reactor pressure vessel and acts not only as the biological shield but also serves to intercept fragments in the event the pressure vessel bursts, so that these fragments cannot damage the protective envelope. The flooding tank should be arranged at the upper end of the cylinder, in order to utilize the space in the usually spherical protective enclosure and to obtain a large liquid head. The plastic for sealing the concrete can include reinforcements in the form of fibers, mats or the like, so that small cracks in the concrete do not immediately become effective as leaks.

In the lower part of the cylinder, passages are advantageously provided which lead to a sump situated underneath the reactor pressure vessel. In the event of a rupture of the flooding tank it is in this manner possible to use the cooling water contained therein for further flooding and cooling, because as the already mentioned, sump pumps are connected to the sump. The passages are advantageously made so that they can be shut off. This is important because it is desirable to separate the air space inside the cylinder from that outside the cylinder to prevent contamination of the operating rooms situated outside the protective cylinder. Suitable as shut-off members are valves, but also diaphragms which rupture at a given pressure determined by a given head of a liquid can be used.

For reducing the reactivity of the reactor in the event of an accident, particularly for the maximum credible accident, one can use, in addition to normal cooling water which contains only about 2200 ppm of boron-enriched cooling water which is used for the first flooding of the reactor core. This enriched cooling water is accommodated, according to a further embodiment of the invention, in the line which leads from the flooding tank to the reactor pressure vessel. The line can advantageously be made thicker in places, in order to accommodate a large volume of the cooling water with higher boron content which arrives at the reactor core first.

Although the invention is illustrated and described herein as a nuclear reactor equipped with a flooding tank and a residual heat removal and emergency cooling system, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
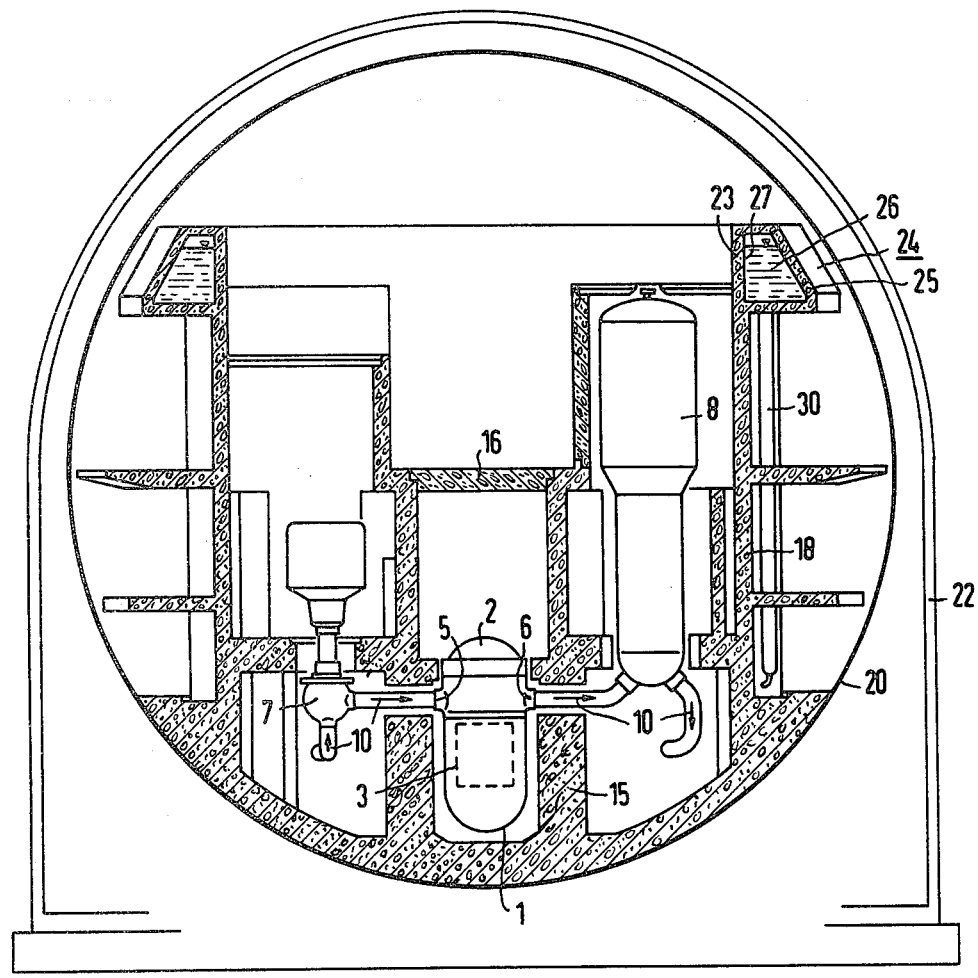
FIG. 1 is an elevation view of a nuclear reactor building, partially in section, illustrating the shape and disposition of the flooding tank in relation to the reactor pressure vessel as required according to the invention.

The nuclear reactor shown is a pressurized-water power reactor with an electric power rating of 1200 MW and is therefore among the largest reactors which are at present provided for the industrial generation of power. Its reactor pressure vessel 1 is closed by a lid 2 and encloses the reactor core 3 indicated by the broken line. The reactor pressure vessel 1 is connected via coolant stubs 5 and 6 with a coolant pump 7 on the one hand and with a steam generator 8 on the other hand so that the flow of the primary coolant indicated by the arrows 10 results. Ordinary water is used as the primary coolant and can contain an addition of boric acid suitable for controlling the reactivity.

The reactor pressure vessel 1 is set in a cylindrical biological shield 15, that is closed off above the lid 2 with a concrete cover 16. A second, larger cylinder 18 of concrete encloses not only the reactor pressure vessel 1, but also the essential elements of the primary cooling circuit, namely: the main coolant pump 7 and the steam generator 8.

The cylinder 18 and the parts of the nuclear reactor and the parts of the primary cooling circuit mentioned above are enclosed in a protective enclosure in the form of a steel sphere which is dimensioned for the equalization pressure which occurs for the maximum credible accident. For this case it is assumed that the entire coolant can escape and build up a definite pressure of for example 5 bar, in the form of a vapor; this the steel sphere 20 as the containment shell must be able to withstand because it has the purpose to ensure under all circumstances that no radioactivity contaminated substances can escape.

The steel sphere 20 is surrounded and supported by a concrete building 22 that serves as a secondary shield and as protection against the weather for the steel sphere 20 as well as a mechanical protection for forces acting from the outside.

As shown in FIG. 1, an annular, hollow concrete body 24 is arranged at the upper rim 23 of the cylinder 18. The cross-section of concrete body 24 is matched to the contour of the containment shell 20 by configuring the annular body 24 to have a beveled side 25. The hollow space 26 of the annular body can be subdivided in the direction of its circumference so that several hollow ring segments are formed. The hollow space 26 serves as the flooding tank and contains the cooling water required for flooding the reactor core 3. Its inner wall 27 is covered with fiberglass-reinforced plastic to achieve the required tightness and a certain strength which prevents the cooling water from escaping if there are cracks in the concrete.

In the illustrated embodiment, the tank 24 is above the highest part of the steam generator 8 and is therefore at an elevation above the upper edge of the reactor core 3 corresponding to several times the height of the reactor pressure vessel 1. The cooling water can therefore be fed to the reactor core via a gravity conduit 30 as will be explained more fully with reference to FIGS. 2 and 3.

Figure 2:
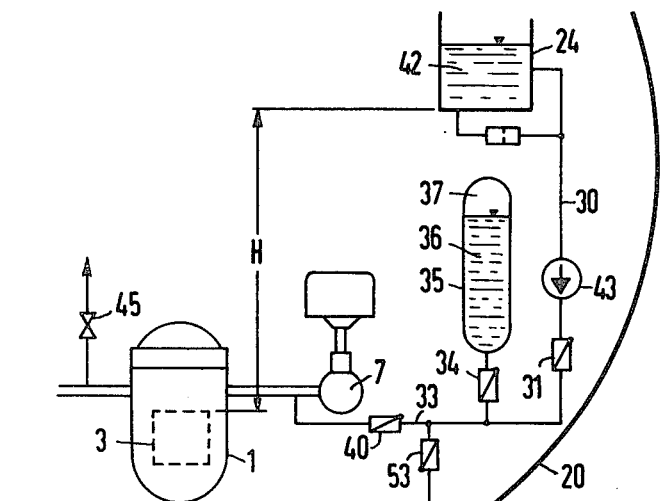
FIG. 2 is a schematic diagram showing how the storage tank is connected to the residual heat removal and emergency cooling system of the nuclear reactor.

FIG. 2 shows that the tank 24 is connected through the line 30 and a check valve 31 to a branch 33 of the emergency cooling and residual heat removal system. This branch includes an accumulator 35 which is connected via the check valve 34. In the accumulator there is cooling water 36 which is under the pressure of a gas cushion 37. The accumulator 35 and the gravity conduit 30 are continuously connected through a further check valve 40 to the coolant line leading to the pump 7, so that in the case that the pressure in the primary cooling circuit of the nuclear reactor 1 is lower than the pressure in the accumulator 35, the cooling water 36 is supplied immediately.

Should the amount of the cooling water 36 not be sufficient because the leak is too large, the contents 42 of the flooding tank 24 can get into the reactor pressure vessel because the check valve 31 opens when the pressure in the coolant system of the nuclear reactor is lower than the liquid head of the cooling water 42 (designated by reference letter H) in the tank 24 above the upper edge of the reactor core 3. If the reactor core is to be flooded with a higher pressure, a pump 43 can be provided in the gravity conduit 30. However, its output pressure can be kept small and need not be as high as the design pressure of the containment shell 20 already discussed.

A quick-discharge valve 45 is arranged at the other, so-called hot branch of the coolant circuit. This valve can be opened if the coolant circuit developes a small leak which manifests itself by a certain small decrease in the pressure per unit time. If the valve 45 is opened, low pressure is reached in a shorter time. As a result, the cooling water 42 gets to the reactor pressure vessel 1 for flooding even without the pump 43 because of the liquid head H alone.

In the embodiment according to FIG. 2, a residual heat removal pump 50 is further provided and has a connection 51 to the sump 52 in the lower part of the containment shell 20. The residual heat removal pump 50 can pump coolant drawn from the sump through a check valve 53 and into the reactor pressure vessel 1 for emergency cooling. The heat of the coolant is removed in the heat exchanger 55 which is equipped with a recooling pump 56. The coolant flows from the reactor pressure vessel 1 through the leak and the quick-discharge valve 45 back to the sump 52.

Figure 3:
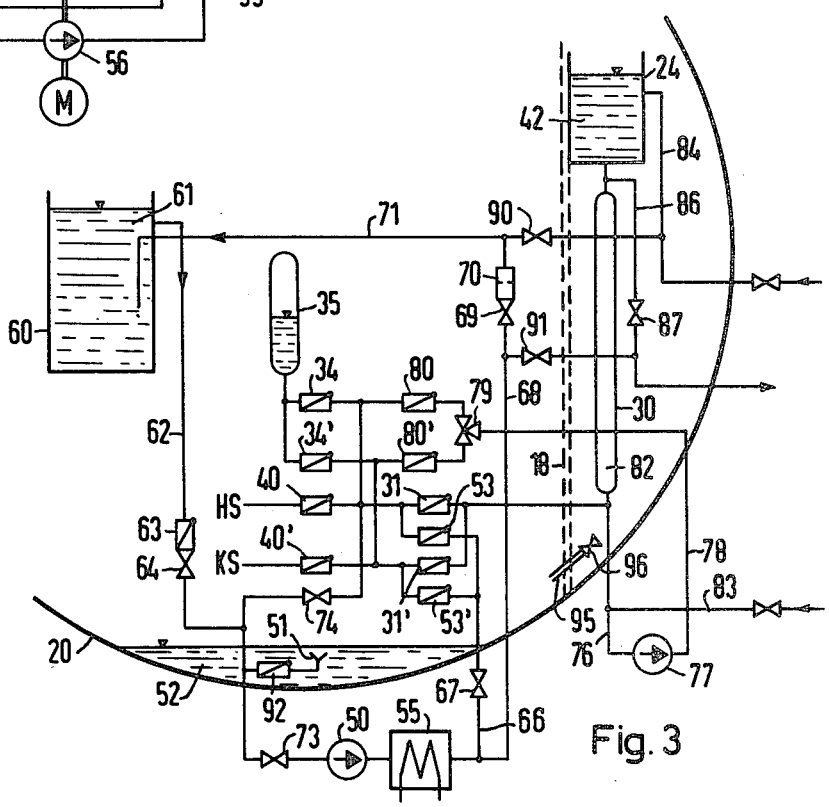
FIG. 3 is also a schematic diagram showing further details of the arrangement of the storage tank and the residual heat removal and emergency cooling system.

In the embodiment according to FIG. 3, the flooding tank 24 with the cooling water 42 is again arranged at the outside of the concrete cylinder 18. The gravity conduit 30, however, is configured to have an increased thickness as shown and leads through the check valves 31 and 31' to the emergency cooling system which includes the accumulator 35. The accumulator 35 is connected via the check valves 34 and 34' to the hot (HS) and cold (KS) branch of the cooling system of the nuclear reactor, where respective check valves 40 and 40' are provided. A storage pit for fuel elements is designated by reference numeral 60 and is provided inside the containment shell 20. The pit 60 is made of concrete and contains cooling water 61. The fuel element storage pit 60 is connected through a suction line 62 with a check valve 63 and a valve 64 to the residual heat removal pump 50 which pumps through the heat exchanger 55.

A valve 67 is provided in the line 66 and is situated outside the containment shell 20. The line 66 is connected to the reactor coolant circuit through the check valves 53 and 53', and specifically, between the check valves 31 and 31' and the reactor pressure vessel, (not shown in FIG. 3). Ahead of the valve, a line 68 branches off which leads back to the fuel element storage pit 60 via a valve 69 and a choke 70 as well as a line 71. Thus, the residual heat removal pump 50 can put in operation a circulation via heat exchanger 55 and the fuel element storage pit. Through a connection 51 which can be shut off via a check valve 92 and a valve 73, the residual heat removal pump 50 can be used as a sump pump after a maximum credible accident.

The circulation for the emergency cooling can be throttled by means of the valve 67 situated outside the containment shell if it can be assumed that after several hours a certain decrease in the escape of residual heat has been reached and that, on the other hand, renewed cooling of the fuel element storage pit becomes necessary. In that case the quantity of liquid pumped by the pump 50 branches.

For the normal residual heat removal procedure however, a valve 74 is opened, so that coolant circulation is established through the heat exchanger 55, the valve 67, the line 66 as well as the check valve 53' to the reactor core and from there back through the valve 74. The check valve 53 is forcibly closed by a positioning drive.

The gravity conduit 30 is connected in FIG. 3 to a suction line 76 of a safety injection pump 77. The pressure line 78 of the pump 77 is connected through a switching valve 79 and check valves 80, 80' to the connections of the accumulator 35. The safety injection pump 77 pumps flowing coolant from the tank 24 into the reactor core if only a small leak and consequently a high opposing pressure is present.

Cooling water of increased boron concentration is contained in the enlarged part 82 of the gravity conduit 30. For this purpose, cooling water with a boron concentration of 7000 ppm is supplied at the lower end of the line 30 through a line 83 by a boron processing facility which is constructed in a manner known per se and is not shown in the drawing; whereas cooling water with a boron concentration of 2200 ppm is fed into the tank 24 via a line 84. Where the tank 24 is joined to the enlarged portion 82, a drain line 86 with a valve 87 is connected which leads to the processing facility. The different concentration between the two parts is thereby maintained. In some circumstances one can also use a diaphragm or the like for this purpose. By means of the connecting lines equipped with valves 90 and 91, the water filling in the fuel element storage pit can be changed.

The tank 24 contains at least the quantity of cooling water required for flooding above the upper edge of the reactor core 3. However, with the arrangement according to the invention, considerably still larger quantities of cooling water can be accommodated in the upper part of the protective enclosure 20 without additional space requirements. Thus, it is easily possible to accommodate 10 to 20 times the volume of the reactor pressure vessel 1 in the annular ring 24 shown in FIG. 1 where it is stored in an earthquake-proof manner by means of the thickwalled cylinder 18. This quantity of cooling water is available for emergency cooling even in the event that the tank 24 breaks, if at the lower end of the cylinder 18, a passage 95 is provided through which the cooling water travels to the sump 52. For the normal case, the passage 95 can be shut by means of a valve 96, in order to prevent contamination of the operating rooms outside the cylinder 18. Instead of an airtight valve, a siphon can also be used to advantage.

What is claimed is:

1. A nuclear reactor having a protective enclosure surrounding equipment comprising a reactor pressure vessel, a coolant circuit connected to said pressure vessel for conducting coolant through the same and exposed directly to the inside of said enclosure, a residual heat removal and emergency cooling system connected to said coolant circuit for providing cooling of the reactor core following a shut down of the reactor or a loss-of-coolant accident, and a flooding tank arranged in said protective enclosure at an elevation above the upper edge of said reactor core, said flooding tank being connected to said circuit and being configured to hold a quantity of liquid sufficient to flood said reactor core in the event of a loss of coolant.

2. The nuclear reactor of claim 1, said flooding tank being located above said upper edge of said reactor core at a height sufficient to provide a pressure head for said liquid so that said liquid can flow unassisted to said reactor pressure vessel.

3. The nuclear reactor of claim 2 comprising a quick discharge valve communicating with said reactor pressure vessel.

4. The nuclear reactor of claim 3, said cooling circuit having a hot branch and a cold branch, said system comprising means for connecting said flooding tank to said cold branch to admit the flooding liquid thereto, said quick discharge valve being connected to said hot branch.

5. The nuclear reactor of claim 1, said system comprising a conduit for directing said liquid away from said flooding tank and toward said reactor pressure vessel and a pump connected in said conduit and developing a pumping pressure less than the design pressure of said protective enclosure.

6. The nuclear reactor of claim 5, said system comprising a check valve connected into said conduit.

7. The nuclear reactor of claim 1, said system comprising a conduit for directing said liquid away from said flooding tank toward said cooling circuit, and a check valve connected into said conduit.

8. The nuclear reactor of claim 7 comprising a fuel element storage pit, a sump located within said protective enclosure, and an arrangement communicating with said coolant circuit for removing residual heat, said arrangement comprising a cooling circulation circuit connected to said storage pit for circulating a liquid therethrough, a pump for driving the liquid through said circulation circuit, and means for connecting said pump to said sump.

9. The nuclear reactor of claim 7, said system comprising an arrangement for removing residual heat including a feed line, said feed line being equipped with a check valve and communicating with said coolant circuit intermediate said check valve of said conduit and said reactor pressure vessel.

10. The nuclear reactor of claim 9, said arrangement comprising a control member disposed outside of said protective enclosure for at least partially blocking said arrangement.

11. The nuclear reactor of claim 9 comprising a fuel element storage pit, and a sump located within said protective enclosure, said arrangement comprising a cooling circulation circuit connected to said storage pit for circulating a liquid therethrough, a pump for driving the liquid through said circulation circuit, and means for connecting said pump to said sump.

12. The nuclear reactor of claim 11, said arrangement comprising a control member disposed outside of said protective enclosure for blocking at least said feed line communicating with said coolant circuit.

13. The nuclear reactor of claim 11, comprising a line connected to said conduit ahead of said check valve in said conduit, and a safety injection pump connected to said lastmentioned line for pumping liquid from said tank into said reactor pressure vessel.

14. The nuclear reactor of claim 1, said flooding tank being configured as an annular ring adjacent said protective enclosure.

15. The nuclear reactor of claim 14, said annular ring having a shape corresponding to the contour of said protective enclosure.

16. The nuclear reactor of claim 15, said flooding tank being made of concrete coated with a layer of plastic.

17. The nuclear reactor of claim 16, said layer of plastic being reinforced with matting.

18. The nuclear reactor of claim 16, said layer of plastic being reinforced with fibers.

19. The nuclear reactor of claim 1, comprising a cylinder enclosing said reactor pressure vessel, said flooding tank being disposed above said cylinder.

20. The nuclear reactor of claim 19 comprising a sump located beneath said reactor pressure vessel, said cylinder having openings at the bottom thereof leading into said sump.

21. The nuclear reactor of claim 20 comprising respective valves closeable air-tight at said openings, said valves opening in response to pressure.

22. The nuclear reactor of claim 19 comprising a sump located beneath said reactor pressure vessel, said cylinder having siphons at the bottom thereof leading into said sump.

23. The nuclear reactor of claim 1, said system comprising a conduit for directing said liquid away from said flooding tank and toward said reactor pressure vessel, and cooling water enriched with boron disposed in said conduit.

24. The nuclear reactor of claim 23, at least one portion of said conduit having a lateral cross-section greater than the lateral cross-section of the remainder of said conduit.

25. A pressurized-water reactor installation having a protective enclosure completely enclosing equipment comprising a pressurized-water reactor pressure vessel containing a core, means forming a pressurized-water circulating circuit connected to said vessel, pressurized water contained by said circuit and vessel and when accidentally released therefrom forming vapor having vapor pressure, said enclosure having a containment strength greater than said vapor pressure and internally forming a space above said reactor and circuit, said vapor being contained in said space, means for holding a supply of emergency water sufficient to flood said vessel to at least above said core and with said emergency water positioned at an elevation above said core in said space and under the pressure in said space, and emergency means for connecting said emergency water to said circuit through a check valve positioned below said elevation, said check valve being normally closed by the pressure of said pressurized water and opening under the pressure of said emergency water at said check valve, when the pressure in said circuit becomes less than the pressure of said emergency water at said check valve.

26. The installation of claim 25 in which said circuit has a heat exchanger and a hot branch leading from said vessel to said heat exchanger and a cold branch leading from said heat exchanger to said vessel, and said check valve connects said emergency water with said cold branch, and said hot branch has means for quickly discharging said coolant to reduce the pressure of said coolant in said circuit.

27. The installation of claim 25 in which said emergency means includes means for pumping said emergency water to said check valve under a pressure less than said vapor pressure.

28. The installation of claim 25 in which said equipment further comprises means for holding a supply of residualheat removal water coolant under the pressure in said space, and means for pumping the just-said supply of coolant under pump pressure into said circuit through a second check valve normally closed by the pressure of said pressurized water and opening when the pressure in said circuit is less than said pump pressure.

* * * * *

UNITED STATES PATENT AND TRADEMARK OFFICE
CERTIFICATE OF CORRECTION

PATENT NO. : 3 929 567
DATED : December 30, 1975
INVENTOR(S) : Hans-Peter Schabert et al It is certified that error appears in the above-identified patent and that said Letters Patent are hereby corrected as shown below:

In column 2, line 35, change "it is to depend desired todepend" to read --it is not desired to depend--

Signed and Sealed this sixth Day of April 1976

[SEAL]

Attest:

RUTH C. MASON
*Attesting Officer*

C. MARSHALL DANN
*Commissioner of Patents and Trademarks*